Patented Dec. 18, 1923.

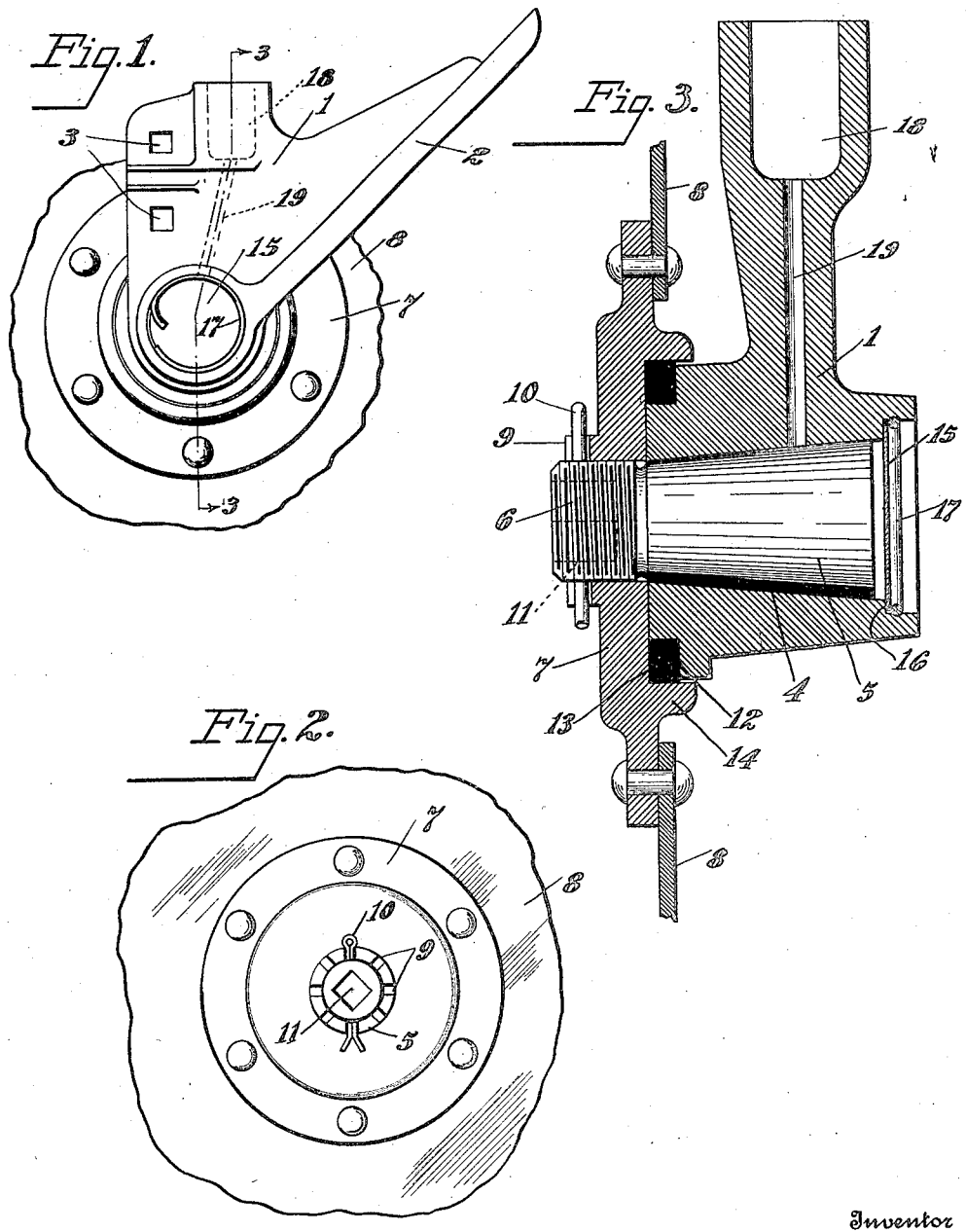

1,477,718

UNITED STATES PATENT OFFICE.

ROBERT S. RODGERS, OF SPRINGFIELD, OHIO, ASSIGNOR TO THE AMERICAN SEEDING MACHINE COMPANY, OF SPRINGFIELD, OHIO, A CORPORATION OF OHIO.

BEARING.

Application filed March 13, 1922. Serial No. 543,140.

*To all whom it may concern:*

Be it known that I, ROBERT S. RODGERS, a citizen of the United States, residing at Springfield, in the county of Clark and State of Ohio, have invented certain new and useful Improvements in Bearings, of which the following is a specification.

This invention relates to improvements in bearings, it more particularly relating to bearings for disk furrow openers for seeding machines.

An object of the invention is to provide a bearing of the character described in which the wear upon the bearing parts may be readily taken up without the necessity of replacing any of the parts.

A further object of the invention is to provide a bearing for the purpose in which wear due to friction is confined practically to the disk spindle and the part in which it is journaled.

A further object of the invention is to provide a bearing of this character which will be simple in construction, effective in operation and economical in manufacture.

Referring to the drawings:

Fig. 1 is an elevation of one side of the device.

Fig. 2 is an elevation of a portion of the opposite side.

Fig. 3 is an enlarged sectional view taken on the line 3—3 of Fig. 1.

Referring to the drawings, 1 represents the hanger or support of a disk furrow opener provided in the usual way with a flange 2 to which the drag-bar (not shown) is attached and also with points of attachment 3 at which the boot and shield (also not shown) are connected thereto. This hanger has a tapered bearing 4 for a tapered spindle 5. The spindle 5 has its small end formed with thread as indicated at 6 and threaded thereon is the hub 7 of a furrow opening disk 8 of the usual concavo-convex form. The outer side of the hub is provided with a boss having cross cuts or grooves 9 and the end of the spindle has an aperture to receive a cotter pin 10 so that the hub may be held in different positions of adjustment on the spindle. Both the bearing and the spindle are tapered in a direction toward the hub so that when the hub is secured to proper adjusted position with respect to the end of the bearing, said parts are locked to position. In the event that it is desirable to take up wear in the bearing, the cotter pin is removed, a suitable tool inserted in the square opening 11 in the end of the spindle, and the hub of the disk turned further in on the spindle.

The end of the bearing portion of the hanger adjacent the hub of the disk is provided with an annular groove 12 to receive a packing washer 13 and the hub of the disk has an annular flange 14, overhanging the packing. The opposite end of the hanger bearing is closed by a dust cap 15 seated against a shoulder 16 and held in position by a split spring ring 17. The hanger also has the usual oil reservoir 18 communicating with the bearing by the channel 19.

By this arrangement it will be seen that practically the only wear is between the hanger bearing and the spindle, the spindle being easily adjusted in the bearing to take up wear.

Having thus described my invention, I claim:—

1. In a bearing for furrow openers, a member having a tapered bearing therein, a tapered spindle in said bearing and a disk adjustably connected with the small end of said spindle so as to be movable thereon and said spindle being rotatable with said disk toward the bearing to take up wear between the spindle and bearing, said bearing and spindle being tapered toward the disk.

2. In a bearing for furrow openers, a member having a tapered bearing, a tapered spindle in said bearing having threads at its small end, and a rotatable disk threaded upon said small end of the spindle to cause the spindle to rotate with said disk, together with means for holding the same in different positions of adjustment thereon.

3. In a bearing for furrow openers, a member having a tapered bearing, a tapered spindle in said bearing, a rotatable disk adjustably connected with the small end of said spindle to cause the spindle to rotate with said disk, packing arranged in a groove in said bearing member adjacent said rotatable member, and means for closing the outer end of said tapered bearing.

4. In a disk furrow opener, a support having a tapered bearing therein, a tapered spindle in said bearing, and a rotatable disk adjustably connected with said spindle adjacent one end of the bearing to cause the spindle to rotate with said disk, said spindle and its bearing being tapered toward the rotatable disk so that said member serves to hold said spindle in position and allows adjustment of same to take up wear.

5. In a disk furrow opener, a stationary member having a tapered bearing therein, a tapered spindle rotatable in said bearing, the wear faces of said bearing and spindle being devoid of shoulders so that said spindle may be adjusted axially in said bearing, and a rotatable disk secured to the small end of said spindle in a manner to be axially adjustable thereon and cause said spindle to rotate therewith, for the purpose specified.

6. In a disk furrow opener, a stationary member having a tapered bearing, a tapered spindle in said bearing, a rotatable disk, and means for adjustably securing said rotatable disk to the small end of said spindle adjacent one end of said bearing, whereby the spindle rotates with the disk and adjustment of the disk on said spindle will compensate for wear between the bearing faces of said bearing and spindle.

In testimony whereof, I have hereunto set my hand this 6th day of March, 1922.

ROBERT S. RODGERS.